United States Patent
Chen et al.

(10) Patent No.: US 9,521,385 B2
(45) Date of Patent: Dec. 13, 2016

(54) IMAGE SENSOR EQUIPPED WITH ADDITIONAL GROUP OF SELECTIVELY TRANSMISSIVE FILTERS FOR ILLUMINANT ESTIMATION, AND ASSOCIATED ILLUMINANT ESTIMATION METHOD

(71) Applicant: Himax Imaging Limited, Tainan (TW)

(72) Inventors: Po-Chang Chen, Tainan (TW); Yuan-Chih Peng, Tainan (TW)

(73) Assignee: Himax Imaging Limited, Tainan (TW)

( * ) Notice: Subject to any disclaimer, the term of this patent is extended or adjusted under 35 U.S.C. 154(b) by 132 days.

(21) Appl. No.: 14/226,833

(22) Filed: Mar. 27, 2014

(65) Prior Publication Data

US 2015/0281666 A1    Oct. 1, 2015

(51) Int. Cl.
| | | |
|---|---|---|
| H04N 9/73 | (2006.01) | |
| H04N 9/083 | (2006.01) | |
| G02B 5/20 | (2006.01) | |
| H04N 5/357 | (2011.01) | |
| H04N 9/04 | (2006.01) | |

(52) U.S. Cl.
CPC ............ H04N 9/735 (2013.01); G02B 5/201 (2013.01); H04N 5/3572 (2013.01); H04N 9/045 (2013.01); H04N 2209/047 (2013.01)

(58) Field of Classification Search
USPC ............... 348/211.9, 223.1, 225.1, 266, 271, 275,348/294, 300, 302, 373–376
See application file for complete search history.

(56) References Cited

U.S. PATENT DOCUMENTS

| | | | |
|---|---|---|---|
| 3,871,065 A | 3/1975 | Iomiyama | |
| 6,573,932 B1* | 6/2003 | Adams, Jr. ............. | H04N 9/735 348/223.1 |
| 6,947,080 B2 | 9/2005 | Ikeda | |
| 7,030,913 B2 | 4/2006 | Ikeda | |
| 7,746,386 B2 | 6/2010 | Nakamura | |
| 7,974,487 B2 | 7/2011 | Yen | |
| 8,049,789 B2 | 11/2011 | Innocent | |

(Continued)

OTHER PUBLICATIONS

Henker et. al., Algorithmic Infrared Correction for CMOS Color Sensors, 8th Microoptics Conference, Osaka, Japan, 2002.

(Continued)

*Primary Examiner* — Aung S Moe
*Assistant Examiner* — Euel Cowan
(74) *Attorney, Agent, or Firm* — Winston Hsu; Scott Margo

(57) ABSTRACT

An image sensor includes a two dimensional array of pixel elements, a color filter array, and a digital circuit. The color filter array is superimposed on and in registration with the two dimensional array of pixel elements. The color filter array includes a first group of selectively transmissive filters and a second group of selectively transmissive filters. The first group of selectively transmissive filters is arranged to selectively transmit spectral energy in M colors of the visible spectrum, wherein M is larger than two. The second group of selectively transmissive filters is arranged to selectively transmit spectral energy in N colors of the visible spectrum, wherein any selectively transmissive filter of the first and the second groups of selectively transmissive filters is arranged to transmit spectral energy in one specific color of the visible spectrum, and N is larger than M. An associated illuminant estimation method is also provided.

13 Claims, 13 Drawing Sheets

(56) References Cited

U.S. PATENT DOCUMENTS

| | | | |
|---|---|---|---|
| 8,130,292 B2 | 3/2012 | Lee | |
| 8,149,294 B2 | 4/2012 | Komiya | |
| 2002/0025164 A1* | 2/2002 | Suzuki | G03B 17/48 396/429 |
| 2010/0128137 A1* | 5/2010 | Guidash | H04N 5/232 348/222.1 |
| 2010/0201850 A1* | 8/2010 | Lin | G06T 3/4015 348/242 |
| 2010/0283875 A1* | 11/2010 | Naskali | H04N 5/2176 348/243 |
| 2012/0293669 A1* | 11/2012 | Mann | G01C 11/025 348/207.11 |
| 2013/0093929 A1 | 4/2013 | Kouyama | |
| 2015/0036029 A1* | 2/2015 | Theuwissen | H04N 9/045 348/273 |
| 2015/0249496 A1* | 9/2015 | Muijs | H04B 10/116 398/118 |

OTHER PUBLICATIONS

Henker et. al., Concept of Color Correction on Multi-Channel CMOS Sensors, Digital Image Computing: Techniques and Applications, Proc. of the 7th Biennial Australian Pattern Recognition Society Conference—DICTA 2003, vol. 2, Macquarie University, Sydney, Australia, 2003, pp. 771-780, Dec. 10, 2003.

Hirakawa et. al., Spatio-Spectral Color Filter Array Design for Optimal Image Recovery, IEEE Transactions on Image Processing, vol. 17, No. 10, Oct. 2008, p. 1876-p. 1890, IEEE.

L. Condat, A New Color Filter Array with Optimal Sensing Properties, IEEE ICIP, Nov. 2009, Cairo, Egypt, p. 457-p. 460, IEEE, Nov. 7, 2009.

\* cited by examiner

IMAGE SENSOR EQUIPPED WITH ADDITIONAL GROUP OF SELECTIVELY TRANSMISSIVE FILTERS FOR ILLUMINANT ESTIMATION, AND ASSOCIATED ILLUMINANT ESTIMATION METHOD

BACKGROUND OF THE INVENTION

1. Field of the Invention

The present invention relates to an image sensor chip with illuminant estimation functionality, and more particularly, to an image sensor such as that equipped with an additional group of selectively transmissive filters for illuminant estimation, and to an associated illuminant estimation method for an image sensor.

2. Description of the Prior Art

A conventional camera system is typically equipped with a main lens for imaging, an infrared-cutoff (IR-cut) filter (e.g. a separate piece of optics, or a photo resist layer of color filters on photo diodes) to block the invisible light for color fidelity, and a color image sensor to receive the illuminated spectral incident through the main lens and the IR-cut filter. The color image sensor is typically equipped with three sets of color pixels respectively occupying three different spectral bands in the visible for color image acquisition. According to the related art, the Bayer pattern is the most famous and widely used. For example, a group of 2×2 pixels can be its fundamental block, whose layout may correspond to a red-green (R-G) pattern in the first row and a green-blue (G-B) pattern in the next row. The Bayer pixels implemented according to the Bayer pattern mentioned above may have its own spectral responses respectively corresponding to the three sets of color pixels. As the IR-cut filter is utilized, the aforementioned spectral responses respectively corresponding to the three sets of color pixels are converted into the resultant pixel spectral responses. Obviously, the spectral responses possess significant errors from CIE sRGB color matching functions. Color correction by a linear matrix may be employed to try solving this problem, but the approximation error (or the color reproduction error) still inevitably exists.

According to the related art, some conventional methods (see Henker et. al., "Algorithmic Infrared Correction for CMOS Color Sensors", and Henker et. al., "Concept of Color Correction on Multi-Channel CMOS Sensors") suggest using a multi-band color filter array (CFA) (which has more than three channels) to improve the approximation. In addition, spatial resolution is addressed by some other conventional methods (see Hirakawa et. al. "Spatio-Spectral Color Filter Array Design for Optimal Image Recovery", and L. Condat, "A New Color Filter Array with Optimal Sensing Properties"), and new CFAs (with multi-channel arrangements) were proposed to reduce aliasing between luminance and chrominance. Additionally, white (or transparent) pixels and IR pixels are introduced into the pixel array by some other conventional methods, respectively, in order to get stronger sensitivity or receive the reflected IR lights of an assistant IR Light Emitting Diode (LED) in dim light/night vision.

Most of the conventional methods seem to focus on CFA designs for "better images", such as accurate color, high resolution, low false color and good SNR. Another function/task relying on CFA is illuminant estimation/color temperature (CT) estimation, which is essential to make color correction/white balance/lens shading correction adaptive to various illuminants. Among the conventional estimation schemes, the CT estimation based on the received color image data is popularly used due to its low-cost advantage, where no extra spectral meter or sensor is needed. Its mechanism relies on the so-called grey-world assumption, that the statistical reflectance of natural objects appears grey in visible band (e.g. with equal spectra), so that the ratios or differences among the means of color/Bayer channels can be used to estimate CT or distinguish illuminants. Even though, one inevitable limitation is with the CT estimation scheme, "illuminant Metamerism". Two illuminants of totally different spectra can result in similar color ratios in Bayer image sensor system (e.g. a tri-chromatic image sensor, such as that of RGB, CMY, etc.) An example can be found in U.S. Pat. No. 8,130,292, where the Incandescent light "2" described therein may give color ratios similar to that of the Fluorescent "6" (and "7") described therein, though their spectra are known to be greatly dissimilar. Moreover, there should exist difference between ideal color correction and lens shading correction parameters for different illuminants, such as the Incandescent light "2" and the Fluorescent "6" mentioned above, and the method based on the CT estimation may choose the same set of parameters for both illuminants and thus increases errors in the case. U.S. Pat. No. 8,049,789 discloses a typical color correction flow using the conventional CT estimation of the related art, while U.S. Pat. No. 6,947,080 discloses a color space for the conventional CT estimation. Similar ideas are used in U.S. Pat. Nos. 7,030, 913, 7,974,487, and 7,746,386 with various modifications. For more information, please refer to U.S. Pat. No. 8,149, 294, and US Patent Application No. 2013/0093929.

As described above, illuminant estimation is important for color correction and lens shading correction. However, the conventional methods such as the conventional CT estimation methods typically suffer from Metamerism limitation and may lead the conventional color correction to a dilemma in some cases. When the conventional illuminant estimation fails, the conventional color correction is unable to provide satisfactory performance. Thus, a novel architecture and method is required for enhancing the performance of the camera system.

SUMMARY OF THE INVENTION

It is therefore an objective of the claimed invention to provide an image sensor, and an associated illuminant estimation method for an image sensor, in order to solve the above-mentioned problems.

It is therefore an objective of the claimed invention to provide an image sensor, and an associated illuminant estimation method for an image sensor, in order to enhance the performance of illuminant estimation and to reach satisfactory overall color correction performance of the whole camera system.

According to at least one preferred embodiment, an image sensor is provided, where the image sensor comprises a two dimensional array of pixel elements, a color filter array, and a digital circuit. The color filter array is superimposed on and in registration with the two dimensional array of pixel elements, and the digital circuit is coupled to the two dimensional array of pixel elements. More particularly, the two dimensional array of pixel elements is arranged to receive light energy of incident light and to convert the received light energy into electrical signals. In addition, the color filter array comprises a first group of selectively transmissive filters and a second group of selectively transmissive filters. The first group of selectively transmissive filters is arranged to selectively transmit spectral energy in M colors of the visible spectrum, wherein M is a positive integer that is larger than two. The second group of selectively transmissive filters is arranged to selectively transmit spectral energy in N colors of the visible spectrum, wherein any selectively transmissive filter of the first and the second groups of selectively transmissive filters is arranged to transmit spectral energy in one specific color of the visible spectrum, and N is a positive integer that is larger than M. Additionally, the digital circuit is configured to generate a plurality of output signals for pixel elements within the two dimensional array of pixel elements, wherein at least one portion of the output signals carries pixel data representing an image of a scene.

According to at least one preferred embodiment, an illuminant estimation method for an image sensor is provided, where the image sensor comprises a multi-band color filter array (CFA). The illuminant estimation method comprises the steps of: determining a plurality of spectral ratio vectors associated with a plurality of pre-defined light sources, respectively; receiving a series of multi-band CFA pixel data from the image sensor; computing a mean value for each spectral channel of a plurality of spectral channels and converting mean values respectively corresponding to the plurality of spectral channels into vector elements of a current spectral ratio vector; comparing the current spectral ratio vector with the spectral ratio vectors of the pre-defined light sources and computing a norm of (or a difference between) the current spectral ratio vector and each of the spectral ratio vectors of the pre-defined light sources, to determine a specific pre-defined light source whose spectral ratio vector is closest to the current spectral ratio vector within the plurality of pre-defined light sources; and outputting a detection result indicating the specific pre-defined light source whose spectral ratio vector is closest to the current spectral ratio vector within the plurality of pre-defined light sources.

It is an advantage of the present invention that the aforementioned image sensor and the aforementioned illuminant estimation method can automatically perform illuminant estimation, where the system implemented with the aforementioned image sensor and the aforementioned illuminant estimation method can be very compact. In addition, by applying the aforementioned image sensor and the aforementioned illuminant estimation method to the camera system, the related art problems (e.g. the Metamerism limitation of the conventional color temperature (CT) estimation based on the chromaticity values from a Bayer image sensor (or a tri-chromatic image sensor), or the increased cost due to adding an additional spectral meter or sensor into the conventional camera system) will no longer be an issue. Additionally, in comparison with the related art, the aforementioned image sensor and the aforementioned illuminant estimation method can enhance the performance of illuminant estimation, and therefore satisfactory overall color correction and lens shading correction performance of the whole camera system can be reached.

These and other objectives of the present invention will no doubt become obvious to those of ordinary skill in the art after reading the following detailed description of the preferred embodiment that is illustrated in the various figures and drawings.

DETAILED DESCRIPTION

According to some embodiments of the present invention, it is proposed to implement a new image sensor architecture, such as an image sensor having a composite color filter array (CFA) layout consisting of a traditional Bayer CFA for imaging aside with a multi-band CFA of a relatively smaller array size (or encircling the Bayer CFA) for illuminant estimation, where the illuminant estimation can be automatically and accurately performed frame by frame within the new image sensor architecture. As a result, the whole camera system can be very compact.

Figure 1:
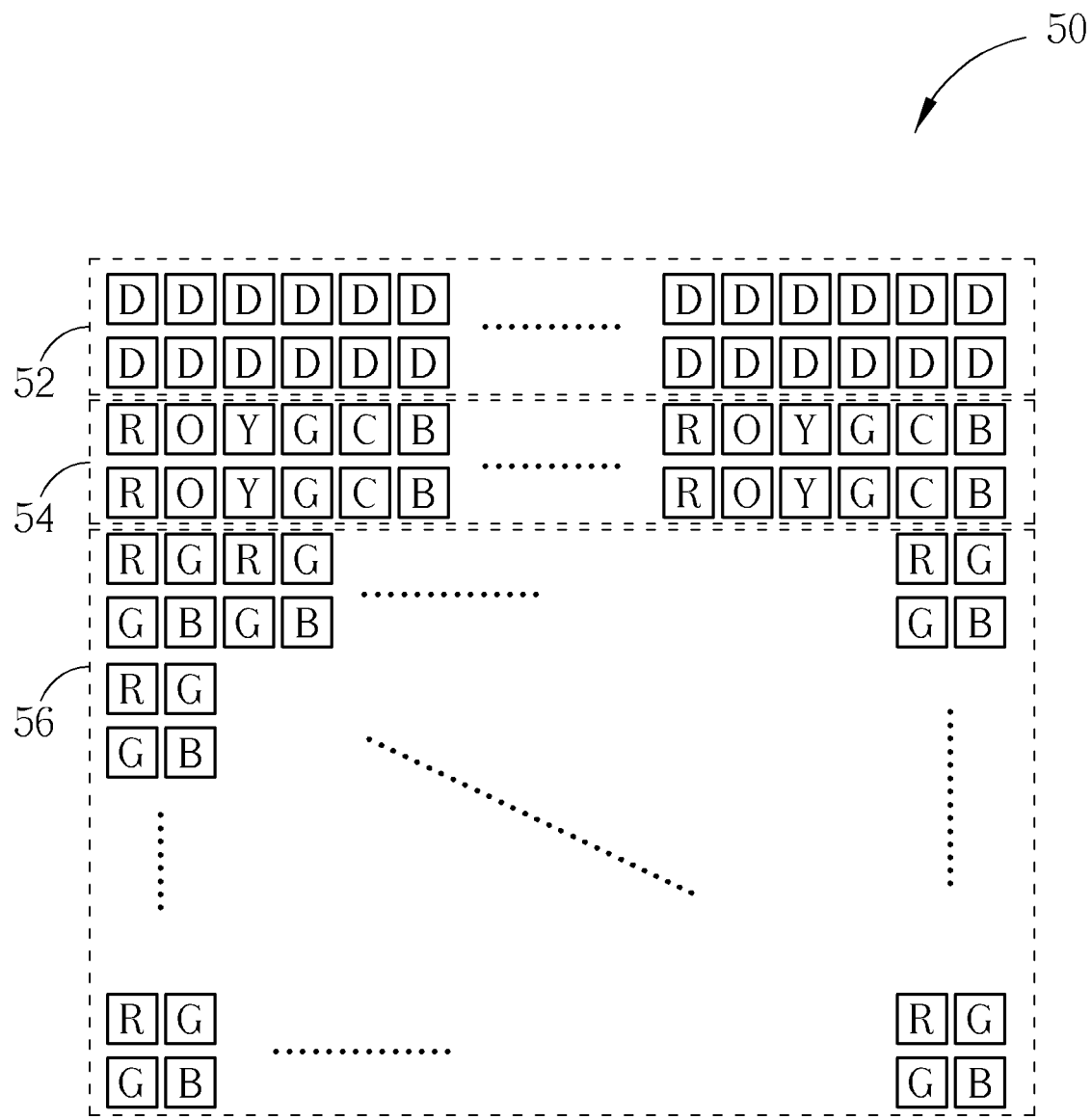
FIG. 1 is a diagram of a color filter array (CFA) according to a first embodiment of the present invention.

FIG. 1 is a diagram of a CFA 50 according to a first embodiment of the present invention. The CFA 50 is superimposed on and in registration with a two dimensional array of pixel elements within an image sensor such as that mentioned above. In this embodiment, the CFA 50 may comprise a first group of selectively transmissive filters, arranged to selectively transmit spectral energy in M colors of the visible spectrum (e.g. M is a positive integer that is larger than two), and may further comprise a second group of selectively transmissive filters, arranged to selectively transmit spectral energy in N colors of the visible spectrum (e.g. N is a positive integer that is larger than M), where any selectively transmissive filter of the first and the second groups of selectively transmissive filters is arranged to transmit spectral energy in one specific color of the visible spectrum.

As shown in FIG. 1, the Bayer CFA 56 can be taken as an example of the aforementioned first group of selectively transmissive filters, where the layout thereof may correspond to a red-green (R-G) pattern in one row and a green-blue (G-B) pattern in the next row. In addition, the multi-band CFA 54 can be taken as an example of the aforementioned second group of selectively transmissive filters, where the layout thereof may correspond to a red-orange-yellow-green-cyan-blue (R-O-Y-G-C-B) pattern in one row. Additionally, the CFA 50 may comprise a group of non-transmissive filters, such as the dark rows (labeled "D" in FIG. 1, for better comprehension), which are arranged to prevent light from entering the corresponding pixel elements (e.g. the dark pixel). For example, these pixel elements can be shielded by metal so no light is received therefrom.

In practice, the group of non-transmissive filters (e.g. the dark rows 52) is the uppermost group within these groups of filters. The dark rows 52 are commonly employed for black level correction (BLC) on active pixel data of the pixel elements respectively corresponding to the multi-band CFA 54 and Bayer CFA 56. In this embodiment, all pixel elements of the aforementioned two dimensional array of pixel elements can be implemented with the same kind of photo diodes, except that the groups of filters thereon are different.

According to this embodiment, the aforementioned second group of selectively transmissive filters is disposed and arranged at one side of the aforementioned first group of selectively transmissive filters. More particularly, the aforementioned one side of the first group of selectively transmissive filters is the top side of the first group of selectively transmissive filters. For example, the multi-band CFA 54 is arranged on the top of Bayer CFA 56. This is for illustrative purposes only, and is not meant to be a limitation of the present invention. According to some variations of this embodiment, the second group of selectively transmissive filters can be disposed and arranged at two or more sides of the first group of selectively transmissive filters. According to some other variations of this embodiment, at least one portion of the second group of selectively transmissive filters is disposed and arranged in at least one area enclosed by the first group of selectively transmissive filters.

Figure 2:
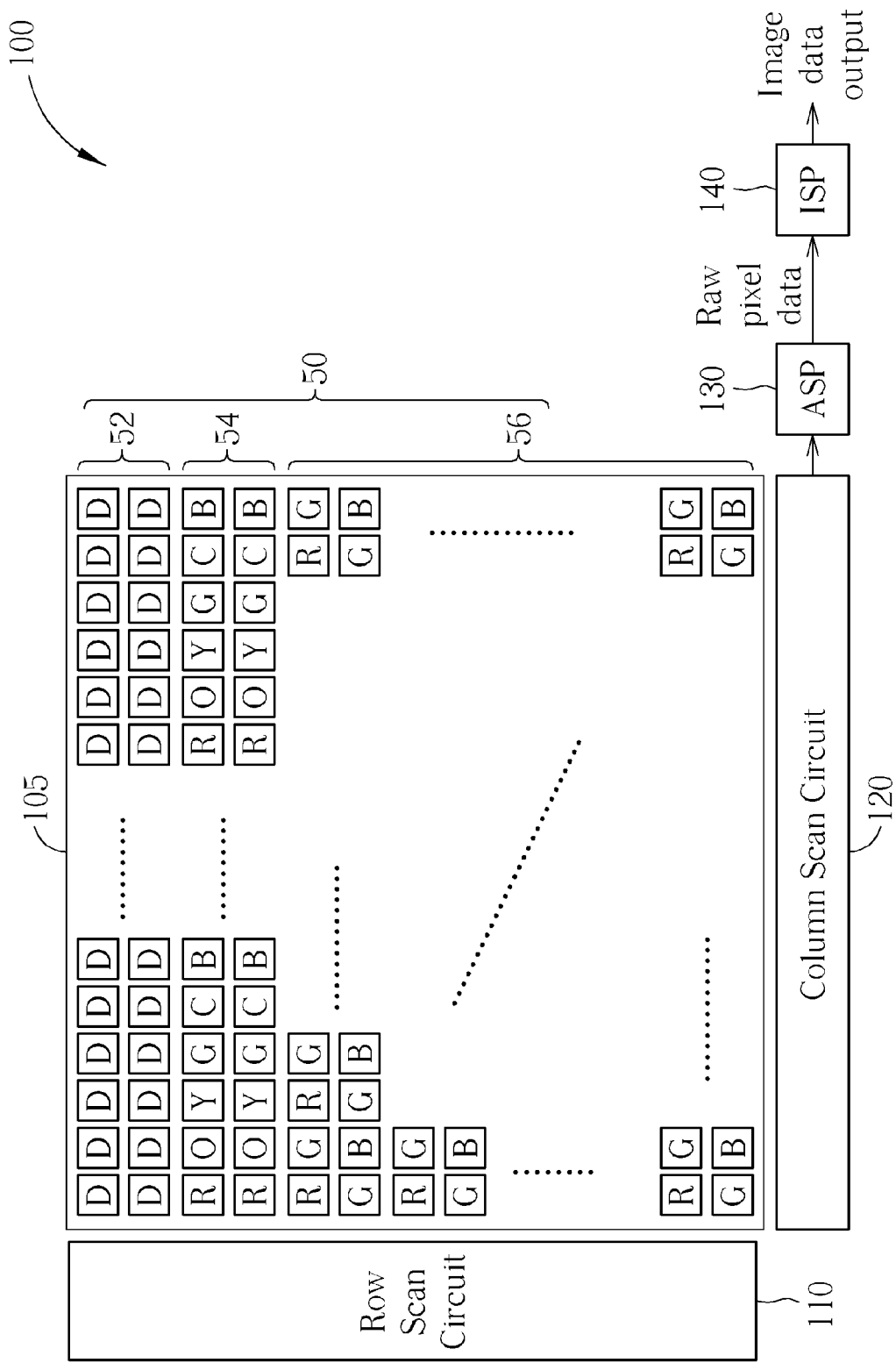
FIG. 2 is a diagram of an image sensor comprising the CFA shown in FIG. 1 according to an embodiment of the present invention.

FIG. 2 is a diagram of an image sensor 100 comprising the CFA 50 shown in FIG. 1 according to an embodiment of the present invention, where the image sensor 100 can be taken as an example of the image sensor mentioned above, and the two dimensional array of pixel elements 105 can be taken as an example of the two dimensional array of pixel elements mentioned above. In addition to the two dimensional array of pixel elements 105 and the CFA 50 thereon, the image sensor 100 may further comprise a digital circuit, which is coupled to the two dimensional array of pixel elements 105, and is configured to generate a plurality of output signals for pixel elements within the two dimensional array of pixel elements, where at least one portion of the output signals carries pixel data representing an image of a scene. For example, the digital circuit mentioned above may comprise a row scan circuit 110 arranged for row scan control, a column scan circuit 120 arranged for column scan control, an analog signal processor (ASP) 130 arranged for analog signal processing to generate raw pixel data, and an image signal processor (ISP) 140 arranged for image signal processing to generate the image data output.

In practice, in a rolling shutter/raster architecture such as that of this embodiment, the exposure is mainly achieved by two operations: resetting a row of pixels at the beginning of photon/electron collection and then reading out the collected electrons in the row after a given integration interval. The readout sequence is normally row-by-row from top to bottom. For example, the ASP 130 is used to condition the received electrons, and typically amplifies signals and converts the signals into digital data (e.g. the raw pixel data). In addition, the ISP 140 is arranged to receive the raw pixel data, apply thereon the data digital processing for purposes of defect correction, sharpening, denoising, demosaicing, color correction, lens shading correction (LSC), etc., and finally output the processed image data.

Figure 3:
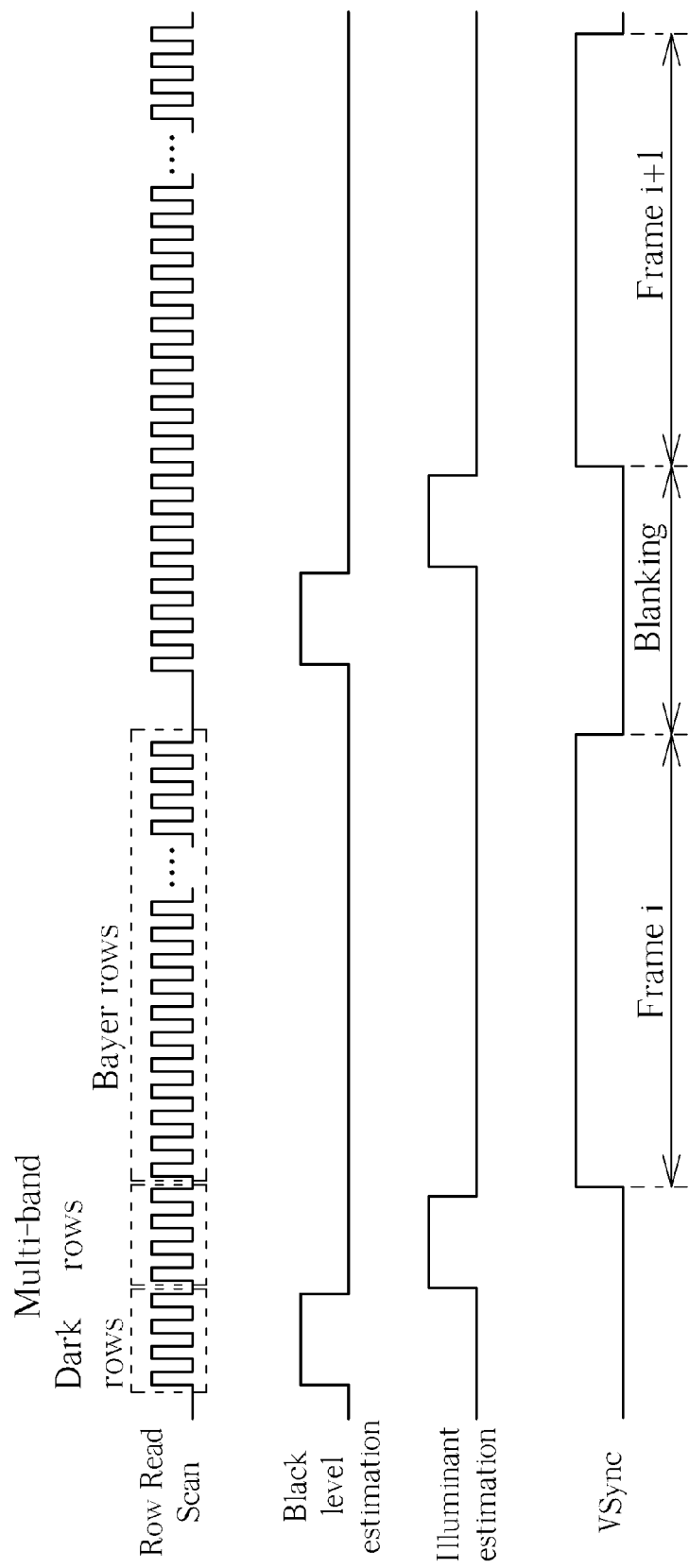
FIG. 3 illustrates associated signals of the image sensor shown in FIG. 2 according to an embodiment of the present invention.

FIG. 3 illustrates associated signals of the image sensor 100 shown in FIG. 2 according to an embodiment of the present invention. As shown in FIG. 3, in each of a plurality of period of the row read scan signal, the row read scan signal may comprise three portions (labeled "Dark rows", "Multi-band rows", and "Bayer rows") respectively corresponding to the dark rows of pixels, the multi-band rows of pixels, and Bayer rows of pixels, where the filters on the dark rows of pixels, the multi-band rows of pixels, and Bayer rows of pixels are the dark rows 52, the multi-band CFA 54, and the Bayer CFA 56 within the CFA 50, respectively. For example, an enabling state of the black level estimation signal (e.g. the high level thereof) can be utilized for enabling black level estimation, and may correspond to the portion labeled "Dark rows" in the row read scan signal. In addition, an enabling state of the illuminant estimation signal (e.g. the high level thereof) can be utilized for enabling illuminant estimation, and may correspond to the portion labeled "Multi-band rows" in the row read scan signal. Additionally, an enabling state of the vertical synchronization (Vsync) signal can be utilized for enabling image data capture of at least one frame (e.g. Frame i, and Frame i+1), and may correspond to the portion labeled "Bayer rows" in the row read scan signal, where a disabling state of the Vsync signal corresponds to blanking between frames.

According to this embodiment, for the image of the scene mentioned above, at least one output signal (e.g. the first few pulses in the portion labeled "Bayer rows" in the row read scan signal) of at least one pixel element corresponding to the aforementioned top side of the first group of selectively transmissive filters (e.g. the Bayer CFA 56 within the CFA 50) is output before at least one output signal (e.g. the last few pulses in the portion labeled "Bayer rows" in the row read scan signal) of at least one pixel element corresponding to the bottom side of the first group of selectively transmissive filters is output, where the bottom side is opposite to the top side. In addition, for the image of the scene mentioned above, at least one output signal (e.g. one or more pulses in the portion labeled "Bayer rows" in the row read scan signal) of at least one pixel element corresponding to the first group of selectively transmissive filters (e.g. the Bayer CFA 56 within the CFA 50) is output after at least one output signal (e.g. one or more pulses in the portion labeled "Multi-band rows" in the row read scan signal) of at least one pixel element corresponding to the second group of selectively transmissive filters (e.g. the multi-band CFA 54 within the CFA 50) is output.

In practice, the dark row pixels are first read out for estimation of the black level, which may be caused by pixel dark current, analog circuit bias, etc., where the estimation of the black level can be referred to as the black level estimation. In this embodiment, with the multi-band CFA 54 in between the dark rows 52 and the Bayer CFA 56, the black level estimation goes first for black level correction of both multi-band pixel data (i.e. the pixel data corresponding to the multi-band CFA 54) and the Bayer pixel data (i.e. the pixel data corresponding to the Bayer CFA 56). Right after that, the illuminant estimation can be carried on using the multi-band pixel data, and therefore its estimated illuminant information can be immediately utilized in color correction and lens shading correction of the current frame data without frame delay. Please note that, in comparison with a conventional color correction scheme (in which the pixel data of a certain frame is used for the conventional CT estimation and parameter selection, and the selected parameter of the conventional CT estimation is applied to a different frame such as the next frame), the architecture of this embodiment may reach better overall performance.

According to some embodiments of the present invention, the digital circuit mentioned above may perform illuminant estimation according to the pixel data generated for the pixel elements corresponding to the second group of selectively transmissive filters, such as the aforementioned multi-band pixel data (i.e. the pixel data corresponding to the multi-band CFA 54), to generate at least one illuminant estimation result (e.g. the estimated illuminant information mentioned above). In addition, the digital circuit may perform color correction and lens shading correction on the pixel data generated for pixel elements corresponding to the first group of selectively transmissive filters, such as the aforementioned Bayer pixel data (i.e. the pixel data corresponding to the Bayer CFA 56), to generate the pixel data representing the image of the scene.

More particularly, before performing the illuminant estimation mentioned above, the digital circuit may perform the black level estimation to obtain the aforementioned black level, and perform the black level correction of both the pixel data generated for the pixel elements corresponding to the second group of selectively transmissive filters (such as the aforementioned multi-band pixel data, i.e. the pixel data corresponding to the multi-band CFA 54) and the pixel data generated for the pixel elements corresponding to the first group of selectively transmissive filters (such as the aforementioned Bayer pixel data, i.e. the pixel data corresponding to the Bayer CFA 56) according to the black level.

According to some embodiments of the present invention, the image sensor may comprise an illuminant information memory arranged for storing spectral ratio information of a plurality of pre-defined illuminants, and may further comprise an illuminant estimation circuit, which is coupled to the illuminant information memory mentioned above, configured to receive a series of output signals associated with the second group of selectively transmissive filters within the plurality of output signals, to compute spectral ratio information based on the received series of output signals, to compare the computed spectral ratio information with the spectral ratio information stored in the illuminant information memory and detect at least one correlated illuminant from the pre-defined illuminants, and to output at least one detection result indicating the detected at least one correlated illuminant, where the series of output signals is generated for a set of pixel elements associated with the second group of selectively transmissive filters within the two dimensional array of pixel elements. Examples of the plurality of pre-defined illuminants mentioned above may include (but not limited to) D65, F7, D40, and F11, which have their own spectra (e.g. the spectra illustrated with the curves shown in FIG. 5). In practice, the spectral ratio information of the plurality of pre-defined illuminants may comprise a plurality of pre-defined spectral ratio vectors corresponding to the plurality of pre-defined illuminants, respectively (e.g. a set of ratio vectors Ratio1, Ratio2, Ratio3, and Ratio4 or another set of spectral ratios Ratiobs1, Ratiobs2, Ratiobs3, and Ratiobs4, which will be explained in some of the following embodiments), for being compared with at least one vector (e.g. one or more vectors) within the computed spectral ratio information mentioned above. For example, the plurality of pre-defined spectral ratio vectors may be calculated in advance with respect to a plurality of spectral channels associated with the second group of selectively transmissive filters, and may be stored in the illuminant information memory in advance, where each pre-defined spectral ratio vector of the plurality of pre-defined spectral ratio vectors is typically consist of multiple elements, which can be referred to as vector elements. More particularly, the vector elements of any pre-defined spectral ratio vector of the plurality of pre-defined spectral ratio vectors may comprise a plurality of spectral ratios with respect to a specific spectral channel within the plurality of spectral channels associated with the second group of selectively transmissive filters, and any spectral ratio of the plurality of spectral ratios can be a ratio of the magnitude of a spectral channel within the plurality of spectral channels to that of the specific spectral channel. Typically, the number of the plurality of spectral channels can be equivalent to the number of colors of the second group of selectively transmissive filters. This is for illustrative purposes only, and is not meant to be a limitation of the present invention.

In addition, according to some embodiments of the present invention, the computed spectral ratio information may comprise a computed spectral ratio vector, and the illuminant estimation circuit may compare the computed spectral ratio information with the spectral ratio information stored in the illuminant information memory by comparing the computed spectral ratio vector with at least one pre-defined spectral ratio vector (e.g. one or more pre-defined spectral ratio vectors) of the plurality of pre-defined spectral ratio vectors. For example, the illuminant estimation circuit may compare the computed spectral ratio vector with the aforementioned at least one pre-defined spectral ratio vector of the plurality of pre-defined spectral ratio vectors to determine a specific pre-defined illuminant whose spectral ratio vector is closest to the computed spectral ratio vector within the plurality of pre-defined illuminants. More particularly, the illuminant estimation circuit may compare the computed spectral ratio information with the spectral ratio information stored in the illuminant information memory by comparing a norm of (or a difference between) the computed spectral ratio vector and each pre-defined spectral ratio vector of the aforementioned at least one pre-defined spectral ratio vector of the plurality of pre-defined spectral ratio vectors. In another example, vector elements of any pre-defined spectral ratio vector of the plurality of pre-defined spectral ratio vectors may comprise a plurality of spectral ratios with respect to a specific spectral channel within a plurality of spectral channels associated with the second group of selectively transmissive filters, and when computing the spectral ratio information based on the received series of output signals, the illuminant estimation circuit may selectively correct channel responses of the plurality of spectral channels, to obtain the computed spectral ratio vector. This is for illustrative purposes only, and is not meant to be a limitation of the present invention.

According to some embodiments of the present invention, the plurality of pre-defined illuminants may represent a plurality of pre-defined light sources, respectively.

Figure 4:
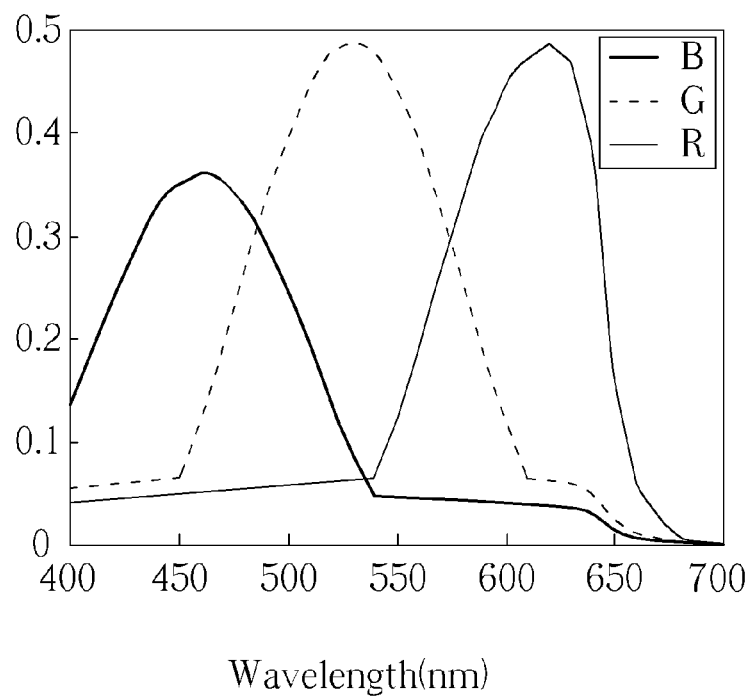
FIG. 4 illustrates exemplary curves of some synthetic Bayer pixel spectral responses according to an embodiment of the present invention.
Figure 5:
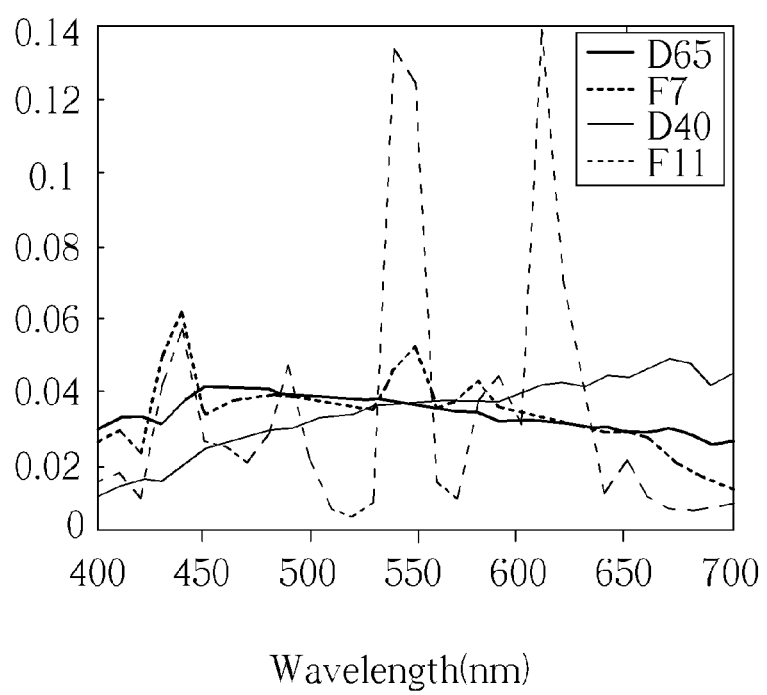
FIG. 5 illustrates exemplary curves of spectra of some illuminants according to the embodiment shown in FIG. 4.
Figure 6:
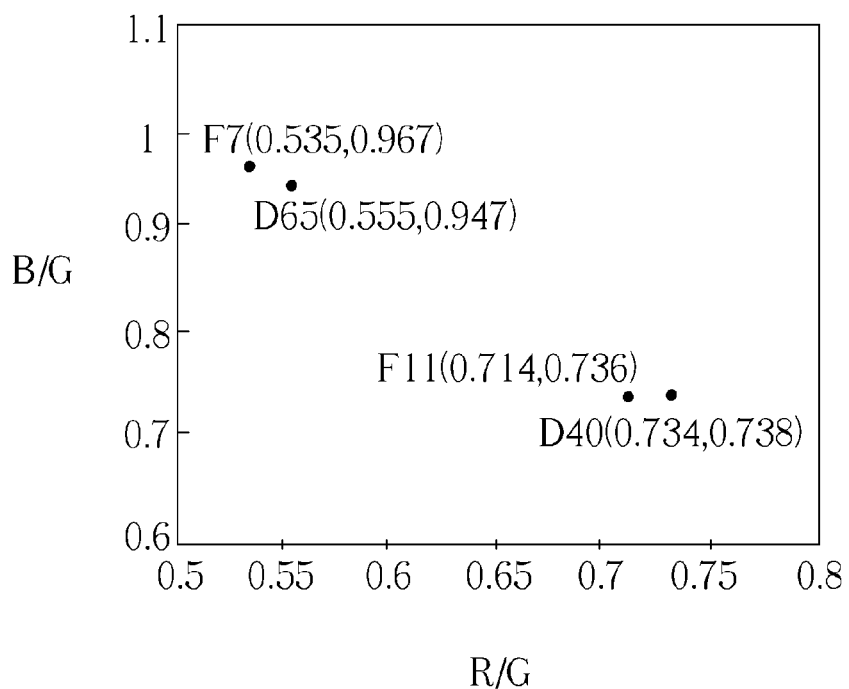
FIG. 6 illustrates the associated color ratios of the illuminants according to the embodiment shown in FIG. 4.

FIG. 4 illustrates exemplary curves of some synthetic Bayer pixel spectral responses according to an embodiment of the present invention, and FIG. 5 illustrates exemplary curves of spectra of some illuminants according to the embodiment shown in FIG. 4, where FIG. 6 illustrates the associated color ratios of the illuminants according to the embodiment shown in FIG. 4. The synthetic Bayer pixel spectral responses shown in FIG. 4 correspond to three types of Bayer pixels, such as the red (R) pixels, the green (G) pixels, and the blue (B) pixels, where an infrared-cutoff (IR-cut) filter such as that mentioned above may be used. Given that the illuminants such as D65, F7, D40, and F11 have their own spectra as shown in FIG. 5, the color ratios of B/G and R/G can be obtained, respectively. Apparently, if the architecture of the present invention such as that shown in FIG. 2 is not utilized or the illuminant estimation functionality of this architecture is disabled, it is difficult to distinguish two illuminants of similar color ratios in practice (e.g. in a situation where noise and/or signal interference exist, the two illuminants may be undistinguishable), since the norm (or the Euclidean distance) between the illuminants F7 and D65 shown in FIG. 6 is merely 0.0202, and the norm (or the Euclidean distance) between the illuminants F11 and D40 shown in FIG. 6 is merely 0.0279.

Figure 7:
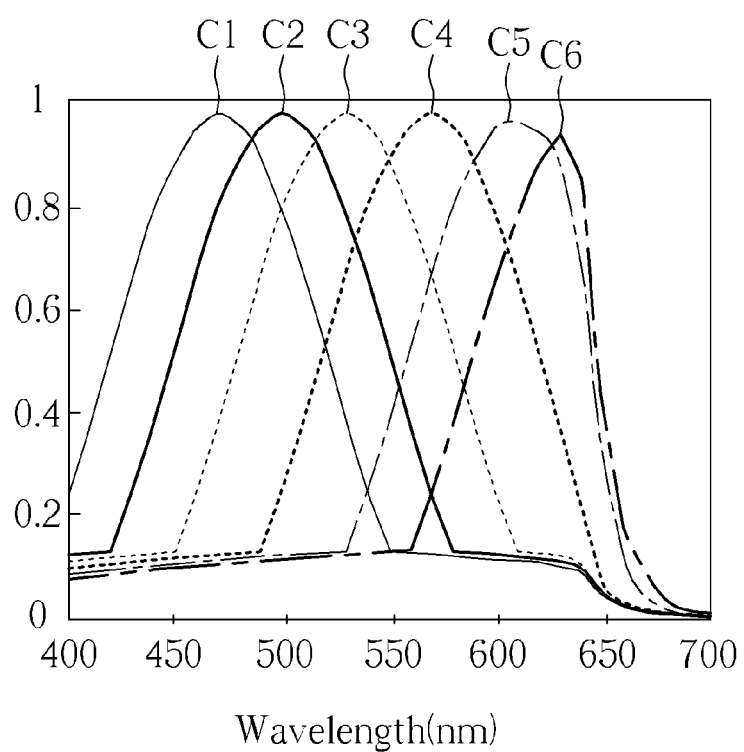
FIG. 7 illustrates exemplary curves of spectral responses of a six-band CFA according to an embodiment of the present invention.

FIG. 7 illustrates exemplary curves of spectral responses C1, C2, C3, C4, C5, and C6 of a six-band CFA according to an embodiment of the present invention, where the six-band CFA can be taken as an example of the multi-band CFA 54 mentioned above. As shown in FIG. 7, the peaks of the spectral responses C1, C2, C3, C4, C5, and C6 of this six-band CFA may correspond to different wavelength, such as 470 nm, 500 nm, 530 nm, 570 nm, 620 nm, and 640 nm, and can be regarded as six channels in this embodiment. For example, the spectral ratios {SpectralRatio$_i$} of this embodiment can be redefined to be:

SpectralRatio$_i$=(mean($I_i$)/mean($I_{i0}$)), $i$=1,2, . . . ,6;

where $I_i$ is the pixel data of the $i^{th}$ channel, and i0 is a predetermined value selected from possible values of the index i. For example, in a situation where i0=3, the above equation can be written as follows:

SpectralRatio$_i$=(mean($I_i$)/mean($I_3$)), $i$=1,2, . . . ,6.

From the six channels, the digital circuit of this embodiment can produce totally four ratio vectors regarding the four illuminants D65, F7, D40, and F11 mentioned above, such as the ratio vectors Ratio 1, Ratio2, Ratio3, and Ratio4 listed below:

Ratio1 = 1.0152  1.0286  1.0000  0.9372  0.7941  0.6088
Ratio2 = 0.9828  0.9966  1.0000  0.9688  0.8027  0.5961
Ratio3 = 0.7991  0.9194  1.0000  1.0697  1.0027  0.7970
Ratio4 = 0.7469  0.8770  1.0000  1.2015  1.0678  0.7899 where the norm between the two illuminants D65 and F7 become 0.0575, and the norm between the two illuminants D40 and F11 become 0.1618. Please note that both of the two norms 0.0575 and 0.1618 are much larger than that obtained from the conventional CT estimation, and therefore the architecture of the present invention such as that shown in FIG. 2 can benefit from the illuminant estimation based on the multi-band CFA 54 such as this six-band CFA. This is for illustrative purposes only, and is not meant to be a limitation of the present invention. According to some variations of this embodiment, the denominator can be the mean of another channel, or a linear combination of selected channel means.

Figure 8:
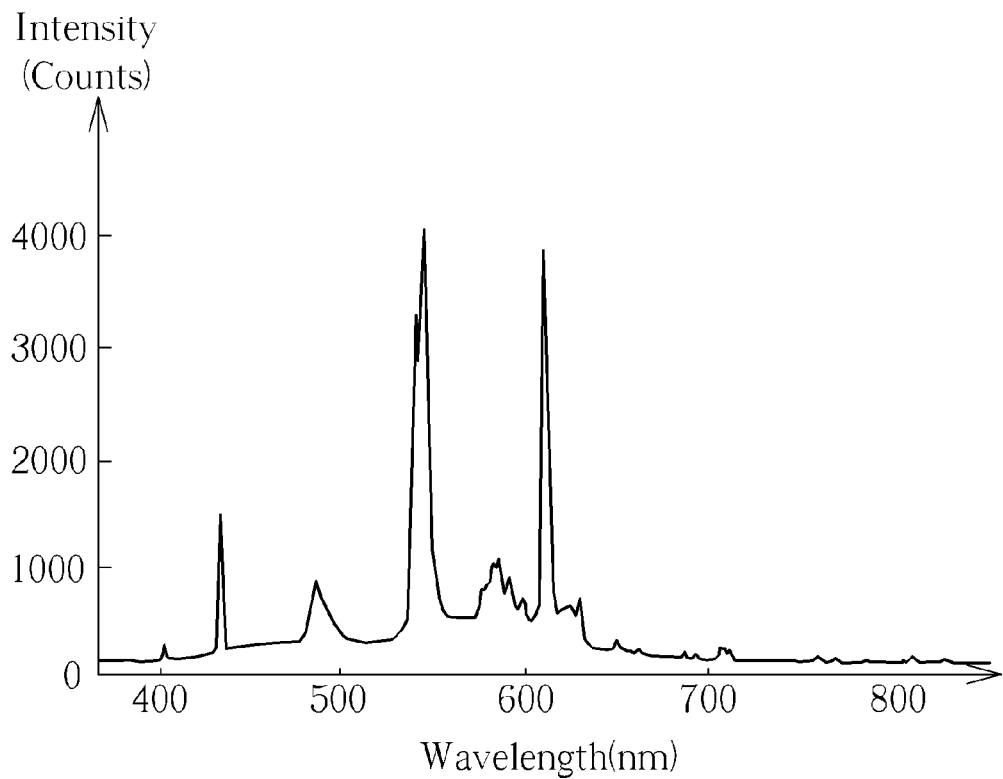
FIG. 8 illustrates an exemplary curve of the spectrum of a specific illuminant according to the embodiment shown in FIG. 7.
Figure 9:
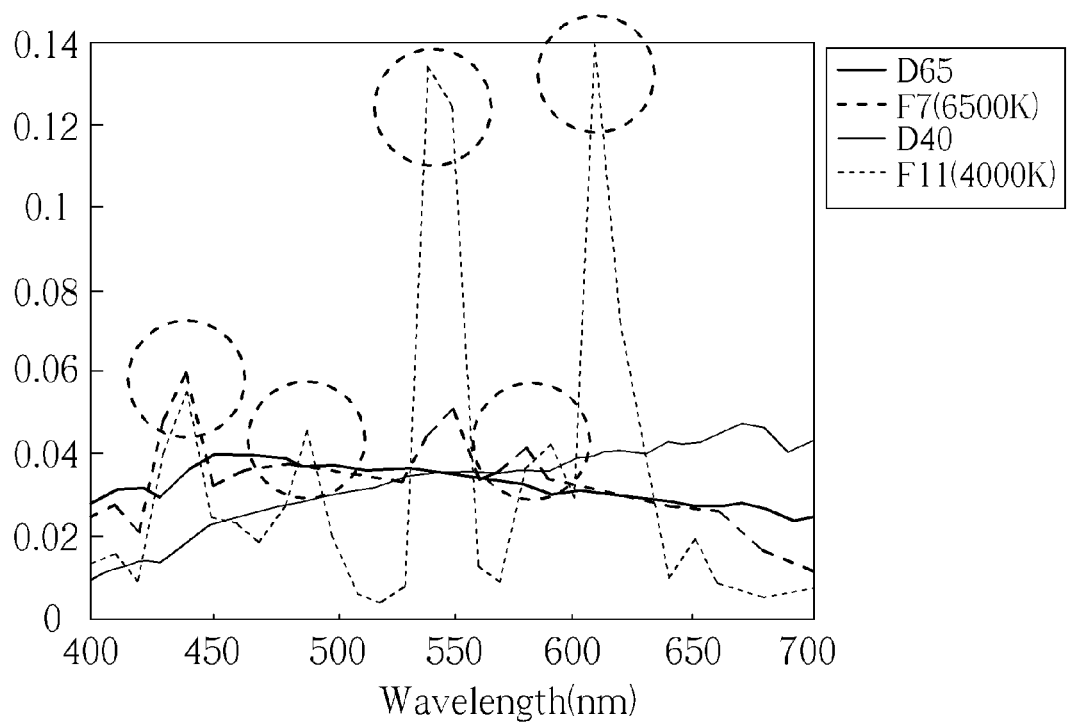
FIG. 9 illustrates some peaks that can be utilized for distinguishing one illuminant from another according to the embodiment shown in FIG. 7.

FIG. 8 illustrates an exemplary curve of the spectrum of a specific illuminant according to the embodiment shown in FIG. 7, and FIG. 9 illustrates some peaks that can be utilized for distinguishing one illuminant from another according to the embodiment shown in FIG. 7. Since the fluorescent lights such as that having the spectrum shown in FIG. 8 possess peaks at specific wavelengths, the characteristics can be used to differentiate this kind of light sources from the Day/Incandescent ones.

Figure 10:
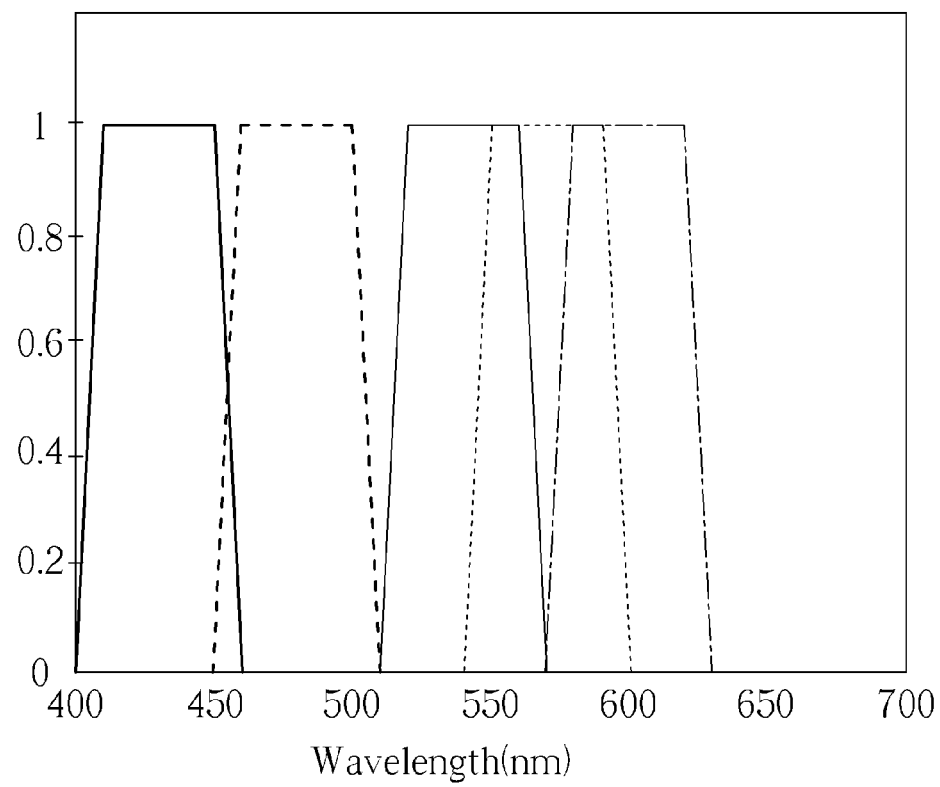
FIG. 10 illustrates a set of target spectral responses according to an embodiment of the present invention.
Figure 11:
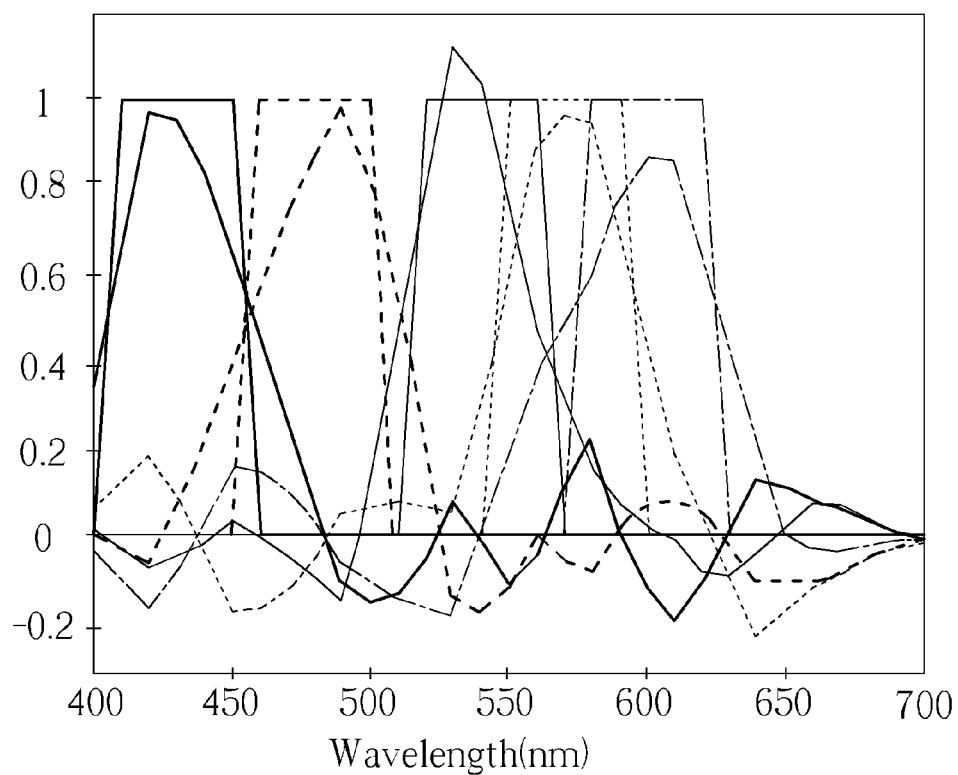
FIG. 11 illustrates exemplary curves of some converted spectral responses according to the embodiment shown in FIG. 10.

FIG. 10 illustrates a set of target spectral responses according to an embodiment of the present invention, and FIG. 11 illustrates exemplary curves of some converted spectral responses according to the embodiment shown in FIG. 10.

For example, the set of target spectral responses {SR$_{tar,j}$, j=1, 2, . . . , 5} can be defined to have their own centers at 440 nm, 490 nm, 550 nm, 580 nm, 610 nm, respectively, and conversion vectors {C$_j$, j=1, 2, . . . , 5} can be computed based on the least square method:

SR$_{tar,j}$=[SR$_1$SR$_2$SR$_3$SR$_4$SR$_5$SR$_6$]C$_j$, j=1,2, . . . ,5;

where {SR$_i$, i=1, 2, . . . , 6} are spectral responses of the six-band CFA.

With the conversion vectors, the equivalent spectral responses are as shown in FIG. 11. The new channel output I$_{bp,j}$ (where the notation "bp" stands for "band at fluorescent peak") can be computed as:

I$_{bp,j}$=I$^T$C$_j$, j=1,2, . . . ,5;

where I=[I$_1$ I$_2$ I$_3$ I$_4$ I$_5$ I$_6$]$^T$.

For example, I$_{bp, 3}$ can be chosen to be the base channel, and the digital circuit of this embodiment can calculate the spectral ratio vectors Ratiobs1, Ratiobs2, Ratiobs3, and Ratiobs4 as follows:

Ratiobs1 = 0.9981  0.9832  1.0000  0.8417  0.8001
Ratiobs2 = 0.9965  0.8559  1.0000  0.9244  0.7999
Ratiobs3 = 0.5050  0.6114  1.0000  0.7875  0.9973
Ratiobs4 = 0.2762  0.3215  1.0000  0.6846  1.0971

As a result, the norm between the two illuminants D65 and F7 goes to 0.1519, and the norm between the two illuminants D40 and F11 goes to 0.3962. In comparison with that of the case without conversion, such as the aforementioned two norms 0.0575 (for D65 and F7) and 0.1618 (for D40 and F11), the larger norms of this embodiment lead to a higher identification rate, causing the overall performance to be further enhanced.

Figure 12:
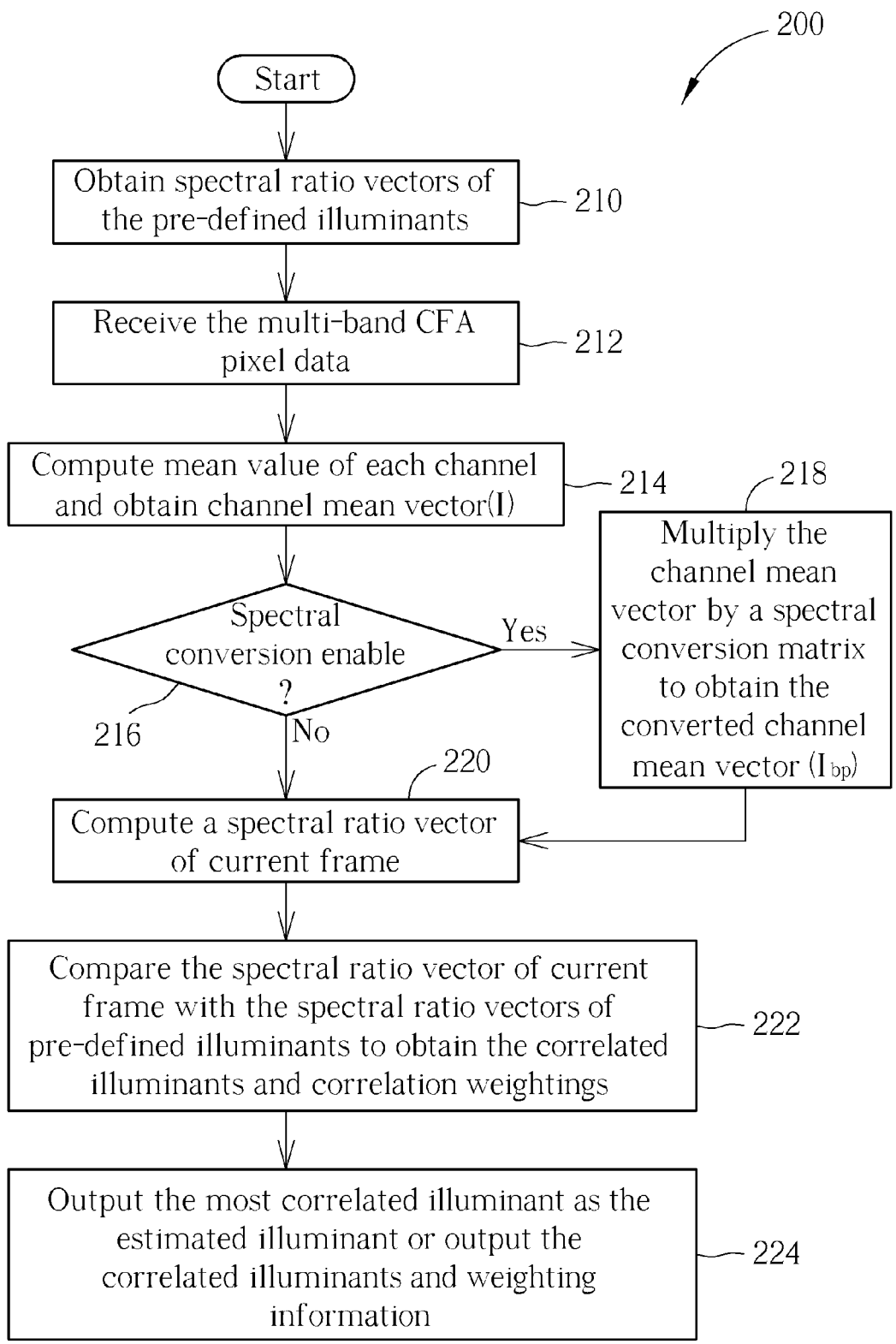
FIG. 12 illustrates a flowchart of a method for performing illuminant estimation according to an embodiment of the present invention.

FIG. 12 illustrates a flowchart of a method 200 for performing illuminant estimation according to an embodiment of the present invention, where some implementation details regarding Step 210 through to Step 220 have been described above.

In Step 210, the illuminant estimation circuit obtains the spectral ratio vectors of the pre-defined illuminants.

In Step 212, the illuminant estimation circuit receives the multi-band CFA pixel data.

In Step 214, the illuminant estimation circuit computes the mean value of each channel and obtain the channel mean vector (I).

In Step 216, the illuminant estimation circuit checks whether spectral conversion is enabled. When it is detected that spectral conversion is enabled, Step 218 is entered; otherwise, Step 220 is entered.

In Step 218, the illuminant estimation circuit multiplies the channel mean vector by a spectral conversion matrix to obtain the converted channel mean vector ($I_{bp}$).

In Step 220, the illuminant estimation circuit computes a spectral ratio vector of the current frame.

In Step 222, the illuminant estimation circuit compares the spectral ratio vector of the current frame with the spectral ratio vectors of pre-defined illuminants to obtain the correlated illuminants and correlation weightings.

In Step 224, the illuminant estimation circuit outputs the most correlated illuminant (of highest weighting) as the estimated illuminant or outputs the correlated illuminants and weighting information.

Please note that Step 222 and Step 224 are related to "correlation", and the associated implementation details are further described below. When the illuminants are pre-specified, the spectral ratio vectors can be computed by the digital circuit of the image sensor 100. For example, F1 through to F7 may represent the spectral ratio vectors of the pre-defined illuminants, and can be expressed as follows:

$$F1 = [\, R11 \quad R12 \quad R13 \quad R14 \quad R15 \quad R16 \,];$$
$$F2 = [\, R11 \quad R12 \quad R13 \quad R14 \quad R15 \quad R16 \,];$$
$$\ldots$$
$$F7 = [\, R71 \quad R72 \quad R73 \quad R74 \quad R75 \quad R76 \,];$$

where the spectral ratio vectors F1, F2, . . . , and F7 can be regarded as the pre-defined illuminant information for correlator. The correlation calculation method may start with receiving a spectral ratio vector of current frame (IL_cur) and then the correlation can be computed with the spectral ratio vectors F1, F2, . . . , and F7 thereof. The correlation calculation method may further comprise calculating distances (or the inverses of the distances), such as {Dist_i=norm(IL_cur-Fi)}, for example. The ones of distances shorter than a threshold are chosen as the correlated illuminants and the inverse of distance can be the correlation weightings, such as (F3, 0.1), (F4, 0.4), (F5, 0.3), (F6, 0.2), for example. The one with the highest weighting can be output to be the estimation result, or, in some examples, all the detected illuminants together with their weightings can be output to be the estimation results. This is for illustrative purposes only, and is not meant to be a limitation of the present invention.

In some other examples, the same algorithm can be used in the case with spectral conversion (e.g. spectral conversion to five bands). The pre-defined illuminant information (generated with spectral conversion to five bands) for correlator can be expressed as follows:

$$F1 = [\, R11' \quad R12' \quad R13' \quad R14' \quad R15' \,];$$
$$F2 = [\, R11' \quad R12' \quad R13' \quad R14' \quad R15' \,];$$
$$\ldots$$
$$F7 = [\, R71' \quad R72' \quad R73' \quad R74' \quad R75' \,].$$

Figure 13:
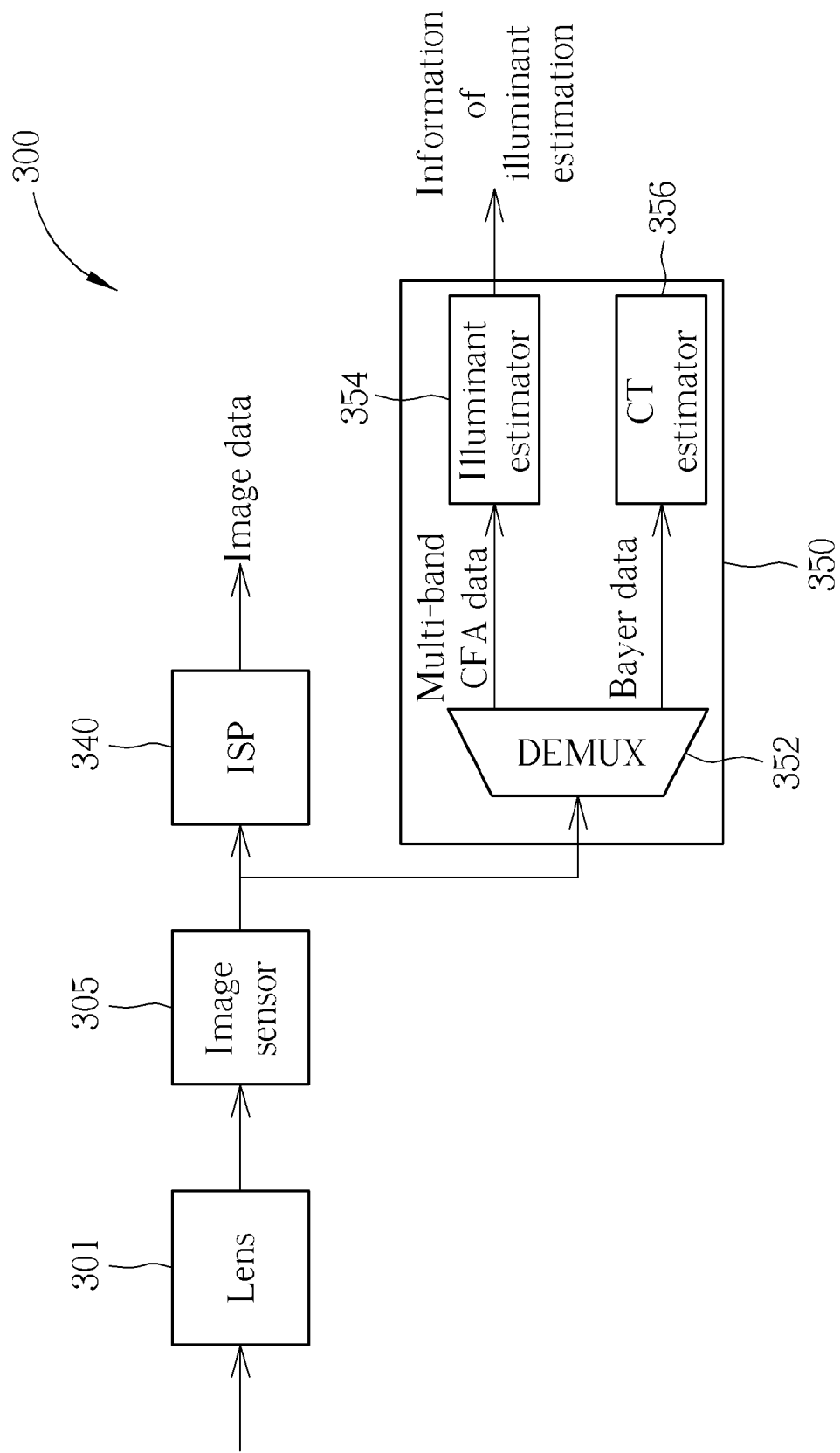
FIG. 13 illustrates a camera system according to an embodiment of the present invention.

FIG. 13 illustrates a camera system 300 according to an embodiment of the present invention. The camera system 300 may comprise a lens 301, an image sensor 305 with a Bayer CFA (e.g. the Bayer CFA 56) and a multi-band CFA (e.g. the multi-band CFA 54) implemented thereon, an ISP 340, and an illuminant estimation circuit 350, where the illuminant estimation circuit 350 may comprise a demultiplexer (DEMUX) 352, an illuminant estimator 354, and a CT estimator 356. For example, the image sensor 305 may comprise most of the components of the image sensor 100, except for the ISP 140, where the ISP 340 can be the same as or similar to the ISP 140. This is for illustrative purposes only, and is not meant to be a limitation of the present invention.

As shown in FIG. 13, the illuminant estimator 354 is arranged to receive the multi-band pixel data from the image sensor 305 for performing illuminant estimation to output the information of illuminant estimation, and the CT estimator 356 is arranged to receive the Bayer data for performing CT estimation.

Figure 14:
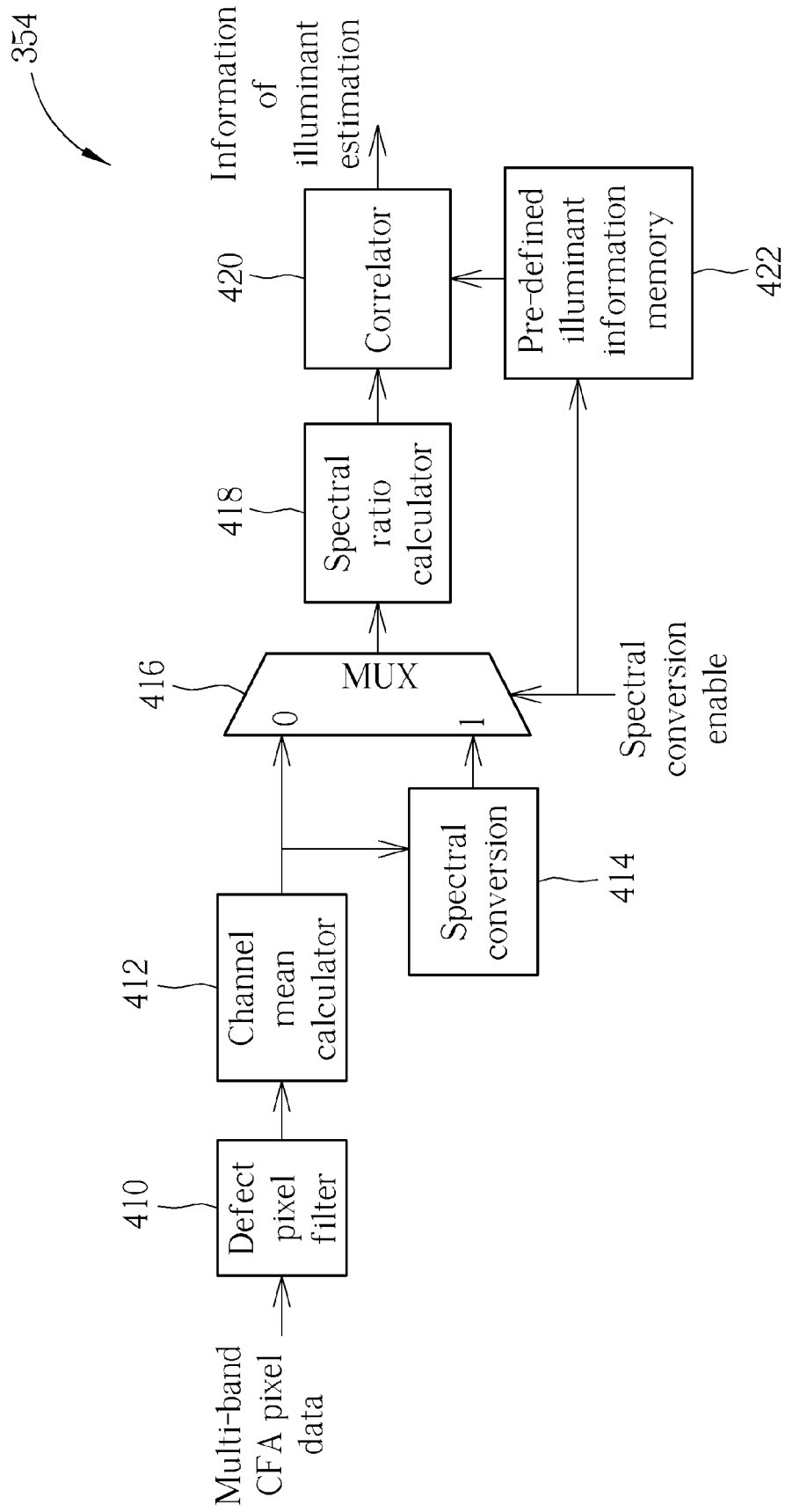
FIG. 14 illustrates the illuminant estimator shown in FIG. 13 according to an embodiment of the present invention.

FIG. 14 illustrates the illuminant estimator 354 shown in FIG. 13 according to an embodiment of the present invention. The illuminant estimator 354 may comprise a defect pixel filter 410 arranged to remove probable defect pixel data so as to avoid unwanted interference by defect pixels. The illuminant estimator 354 may further comprise a channel mean calculator 412 arranged to calculate channel means such as that mentioned above, a spectral conversion unit 414 arranged to perform spectral conversion mentioned above, a multiplexer (MUX) arranged to select the associated signal corresponding to the operation of Step 216 according to a spectral conversion enable signal, a spectral ratio calculator 418 arranged to calculate spectral ratios such as that mentioned above, a correlator 420 arranged to perform correlation as described above, and a pre-defined illuminant information memory 422 arranged to store the spectral ratio vectors of the pre-define illuminants. Similar descriptions for this embodiment are not repeated in detail here.

Figure 15:
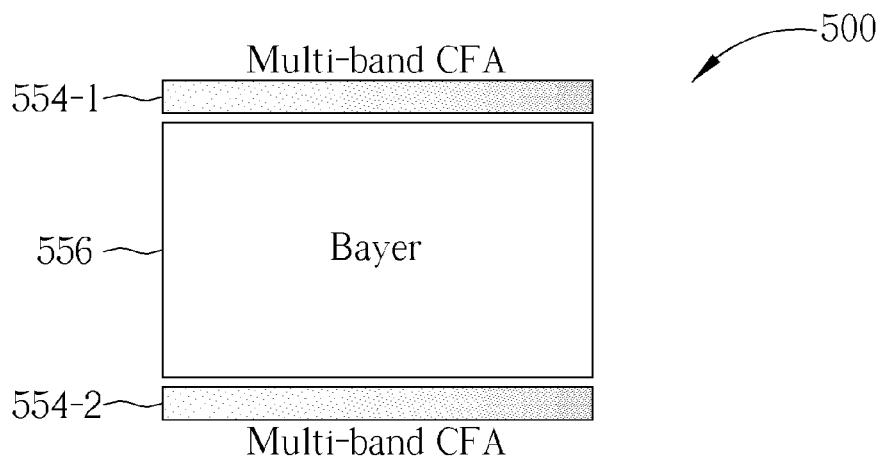
FIG. 15 illustrates a multi-band CFA arrangement of a CFA according to an embodiment of the present invention.

FIG. 15 illustrates a multi-band CFA arrangement of a CFA 500 according to an embodiment of the present invention. The CFA 500 can be altered from the CFA 50 by dividing the multi-band CFA 54 into two portions that are rearranged to be the multi-band CFAs 554-1 and 554-2, where the Bayer CFA 556 can be the same as or similar to the Bayer CFA 56. This is for illustrative purposes only, and is not meant to be a limitation of the present invention. According to a variation of this embodiment, each of the multi-band CFAs 554-1 and 554-2 may have the same size as that of the multi-band CFA 54. According to another variation of this embodiment, the size of each of the multi-band CFAs 554-1 and 554-2 may be greater than that of the multi-band CFA 54.

In practice, increasing the pixel number corresponding to multi-band CFAs can reduce the probability of failure especially in the case with local simple or monotonous objects (where Grey world assumption does not hold).

Figure 16:
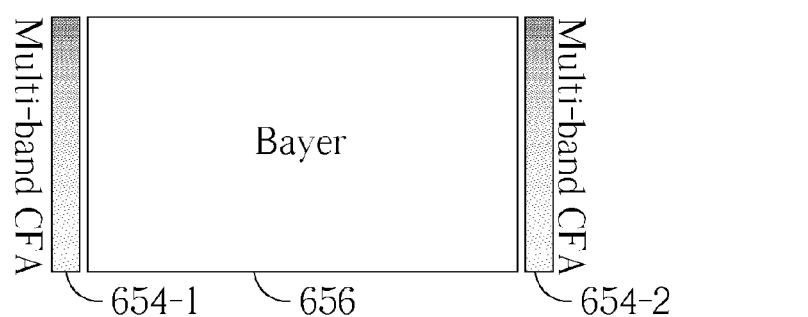
FIG. 16 illustrates a multi-band CFA arrangement of a CFA according to another embodiment of the present invention.

FIG. 16 illustrates a multi-band CFA arrangement of a CFA 600 according to another embodiment of the present invention. The CFA 600 can be altered from the CFA 50 by dividing the multi-band CFA 54 into two portions that are rearranged to be the multi-band CFAs 654-1 and 654-2, where the Bayer CFA 656 can be the same as or similar to the Bayer CFA 56. This is for illustrative purposes only, and is not meant to be a limitation of the present invention. According to a variation of this embodiment, each of the multi-band CFAs 654-1 and 654-2 may have the same size as that of the multi-band CFA 54. According to another variation of this embodiment, the size of each of the multi-band CFAs 654-1 and 654-2 may be greater than that of the multi-band CFA 54.

Figure 17:
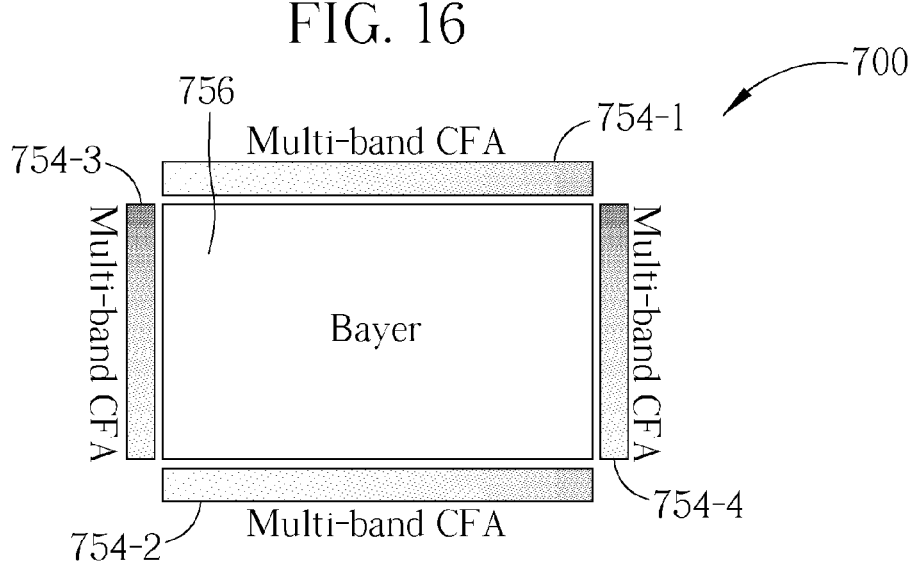
FIG. 17 illustrates a multi-band CFA arrangement of a CFA according to another embodiment of the present invention.

FIG. 17 illustrates a multi-band CFA arrangement of a CFA 700 according to another embodiment of the present invention. The CFA 700 can be altered from the CFA 50 by dividing the multi-band CFA 54 into four portions that are rearranged to be the multi-band CFAs 754-1, 754-2, 754-3, and 754-4, where the Bayer CFA 756 can be the same as or similar to the Bayer CFA 56. According to a variation of this embodiment, each of the multi-band CFAs 754-1, 754-2, 754-3, and 754-4 may have the same size as that of the multi-band CFA 54. According to another variation of this embodiment, the size of each of the multi-band CFAs 754-1, 754-2, 754-3, and 754-4 may be greater than that of the multi-band CFA 54.

Figure 18:
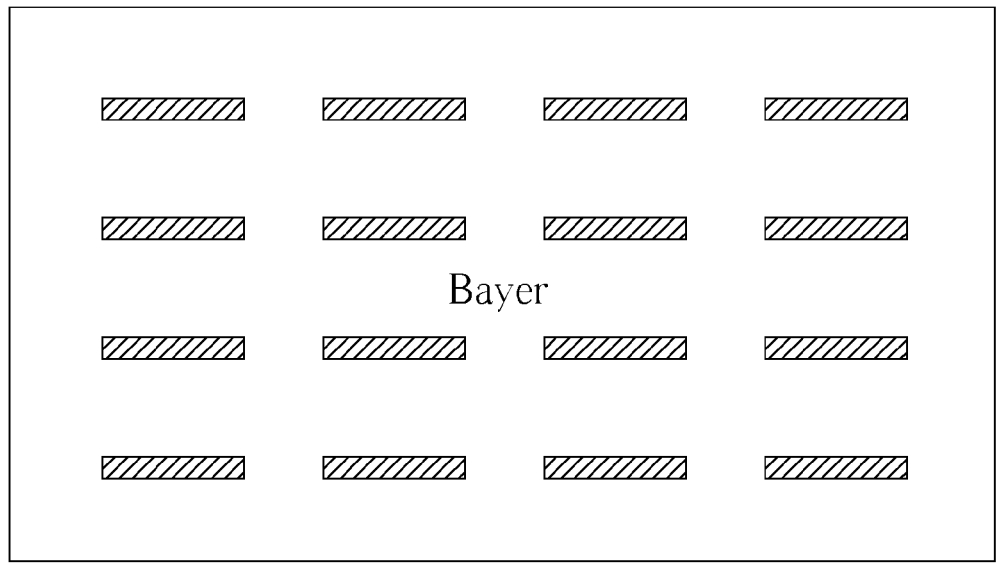
FIG. 18 illustrates a multi-band CFA arrangement of a CFA according to another embodiment of the present invention.

FIG. 18 illustrates a multi-band CFA arrangement of a CFA according to another embodiment of the present invention. This CFA can be altered from the CFA 50 by dividing the multi-band CFA 54 into multiple portions to be rearranged. To improve the sampling, in this embodiment, a fundamental set of the multi-band CFAs (e.g. the shaded portions shown in FIG. 18) can be sparsely spread into the Bayer CFA (e.g., in either regular or random order), or the multi-band pixels can be sparsely spread into that of the Bayer CFA. In this case, the multi-band CFA coordinates may have to be provided to the ISP for switching the processing, such as defeat correction, Bayer interpolation, color correction, etc.

Figure 19:
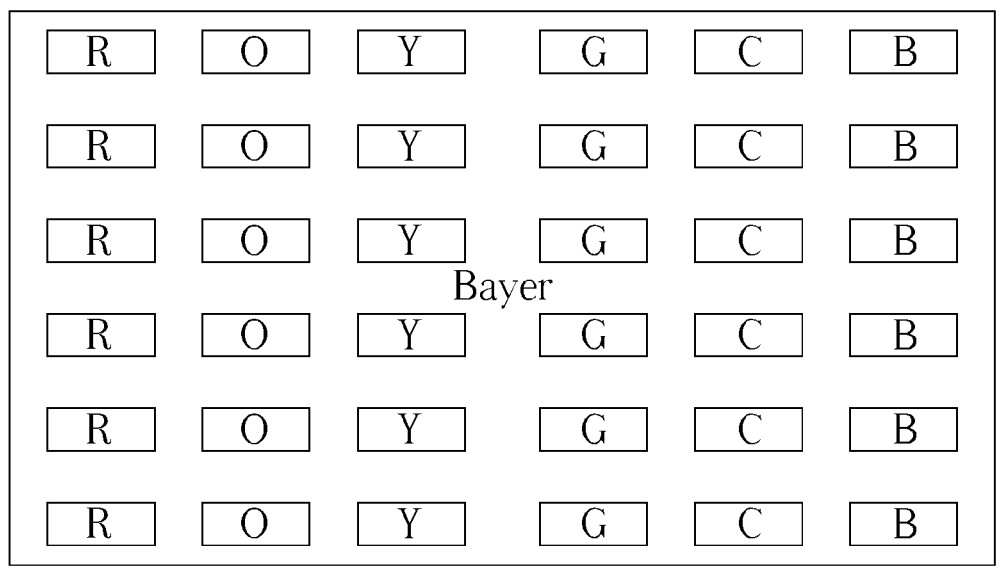
FIG. 19 illustrates a multi-band CFA arrangement of a CFA according to another embodiment of the present invention.

FIG. 19 illustrates a multi-band CFA arrangement of a CFA according to another embodiment of the present invention. This CFA can be altered from the CFA 50 by dividing the multi-band CFA 54 into multiple portions to be rearranged. To improve the sampling, in this embodiment, the selectively transmissive filters of the second group of selectively transmissive filters (e.g. those labeled "R", "O", "Y", "G", "C", and "B" in FIG. 19) can be sparsely spread into the Bayer CFA (e.g., in either regular or random order), or the multi-band pixels can be sparsely spread into that of the Bayer CFA. In this case, the multi-band CFA coordinates may have to be provided to the ISP for switching the processing, such as defeat correction, Bayer interpolation, color correction, etc.

Figure 20:
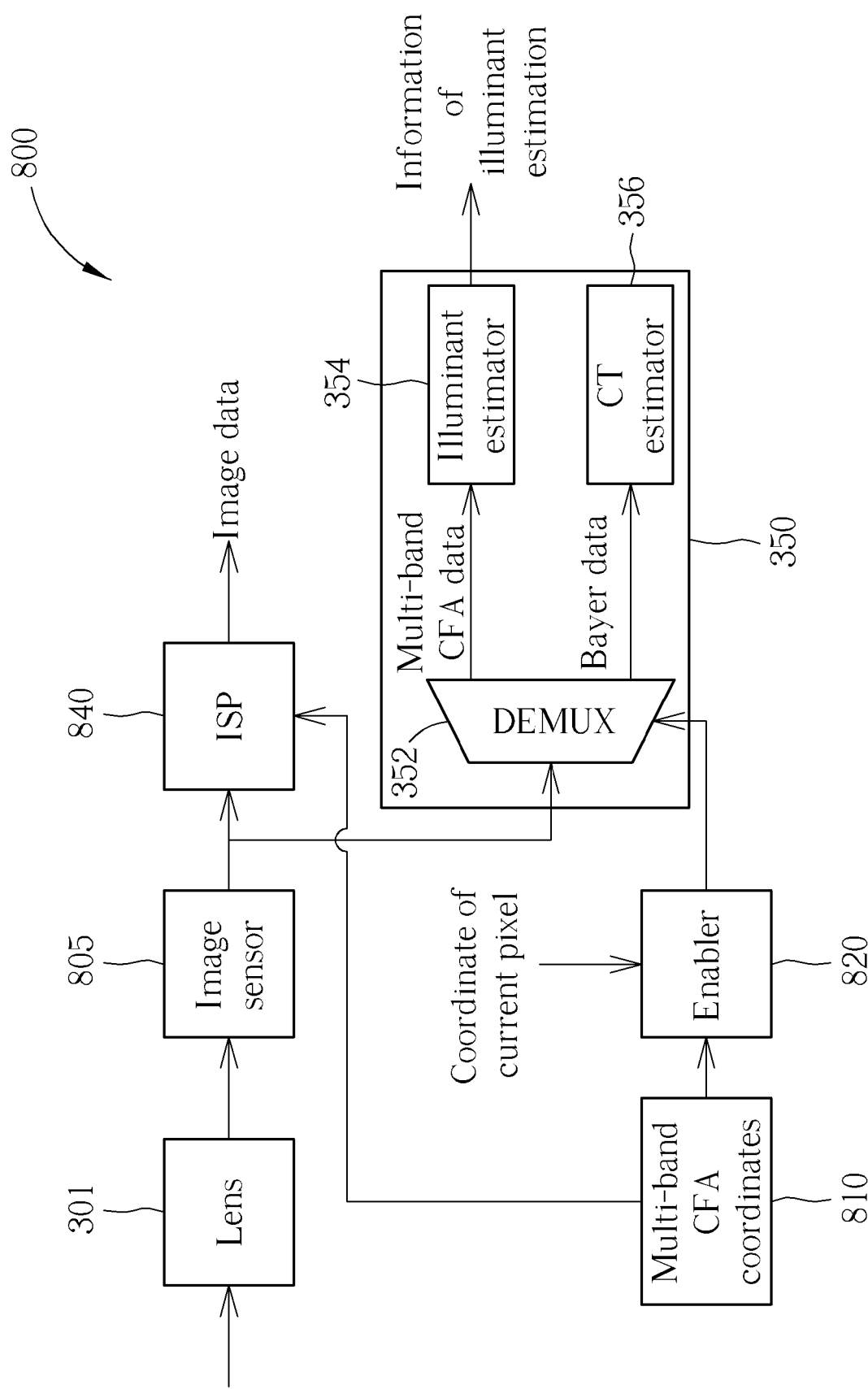
FIG. 20 illustrates a camera system according to another embodiment of the present invention.

FIG. 20 illustrates a camera system 800 according to another embodiment of the present invention. The architecture shown in FIG. 20 can be applied to any of the embodiments shown in FIG. 18 and FIG. 19, to implement the switching based on the associated multi-band CFA coordinates. In comparison with the architecture shown in FIG. 13, the camera system 800 further comprise the multi-band CFA coordinates 810 unit arranged to store the multi-band CFA coordinates, and an enabler 820 arranged to selectively enable the upper path of the two output paths of the DEMUX 352 according to the coordinates of the current pixel and the multi-band CFA coordinates. In response to the change of the architecture, the image sensor 305 and the ISP 340 are referred to as the image sensor 805 and the ISP 840, respectively. Similar descriptions for this embodiment are not repeated in detail here.

Based on the embodiments described above, an illuminant estimation method for an image sensor is provided, where the image sensor comprises a multi-band CFA, and the illuminant estimation method comprising the steps of: determining a plurality of spectral ratio vectors associated with a plurality of pre-defined light sources, respectively; receiving a series of multi-band CFA pixel data from the image sensor; computing a mean value for each spectral channel of a plurality of spectral channels and converting mean values respectively corresponding to the plurality of spectral channels into vector elements of a current spectral ratio vector; comparing the current spectral ratio vector with the spectral ratio vectors of the pre-defined light sources and computing a norm of (or a difference between) the current spectral ratio vector and each of the spectral ratio vectors of the pre-defined light sources, to determine a specific pre-defined light source whose spectral ratio vector is closest to the current spectral ratio vector within the plurality of pre-defined light sources; and outputting a detection result indicating the specific pre-defined light source whose spectral ratio vector is closest to the current spectral ratio vector within the plurality of pre-defined light sources. More particularly, right after computing the mean for each spectral channel of the plurality of spectral channels and converting the spectral channel mean values into the vector elements of the current spectral ratio vector, the current spectral ratio vector is multiplied by a spectral conversion vector so that one or more spectral bands of interest are further weighted. Similar descriptions for this illuminant estimation method are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor, comprising:
   a two dimensional array of pixel elements, arranged to receive light energy of incident light and to convert the received light energy into electrical signals;
   a color filter array, superimposed on and in registration with the two dimensional array of pixel elements, the color filter array comprising:
   a first group of selectively transmissive filters, arranged to selectively transmit spectral energy in M colors of the visible spectrum, wherein M is a positive integer that is larger than two; and
   a second group of selectively transmissive filters, arranged to selectively transmit spectral energy in N colors of the visible spectrum, wherein any selectively transmissive filter of the first and the second groups of selectively transmissive filters is arranged to transmit spectral energy in one specific color of the visible spectrum, and N is a positive integer that is larger than M; and
   a digital circuit, coupled to the two dimensional array of pixel elements, configured to generate a plurality of output signals for pixel elements within the two dimensional array of pixel elements, wherein at least one portion of the output signals carries pixel data representing an image of a scene;
   wherein the image of the scene corresponds to raw image data of pixel elements corresponding to the first group of selectively transmissive filters, and correction of the image is performed according to information derived from pixel elements corresponding to the second group of selectively transmissive filters; and the digital circuit operates according to an illuminant estimation method for the image sensor, the color filter array comprises a multi-band color filter array (CFA), and the illuminant estimation method comprises the steps of:

determining a plurality of spectral ratio vectors associated with a plurality of pre-defined light sources, respectively;

receiving a series of multi-band CFA pixel data from the image sensor;

computing a mean value for each spectral channel of a plurality of spectral channels and converting mean values respectively corresponding to the plurality of spectral channels into vector elements of a current spectral ratio vector;

comparing the current spectral ratio vector with the spectral ratio vectors of the pre-defined light sources and computing a norm of the current spectral ratio vector and each of the spectral ratio vectors of the pre-defined light sources, to determine a specific pre-defined light source whose spectral ratio vector is closest to the current spectral ratio vector within the plurality of pre-defined light sources; and outputting a detection result indicating the specific pre-defined light source whose spectral ratio vector is closest to the current spectral ratio vector within the plurality of pre-defined light sources.

2. The image sensor of claim 1, wherein the second group of selectively transmissive filters is disposed and arranged at one side of the first group of selectively transmissive filters.

3. The image sensor of claim 2, wherein the one side of the first group of selectively transmissive filters is a top side of the first group of selectively transmissive filters.

4. The image sensor of claim 3, wherein for the image of the scene, at least one output signal of at least one pixel element corresponding to the top side of the first group of selectively transmissive filters is output before at least one output signal of at least one pixel element corresponding to a bottom side of the first group of selectively transmissive filters is output, wherein the bottom side is opposite to the top side.

5. The image sensor of claim 2, wherein the digital circuit performs illuminant estimation according to pixel data generated for pixel elements corresponding to the second group of selectively transmissive filters, to generate at least one illuminant estimation result.

6. The image sensor of claim 5, further comprising a third group of non-transmissive filters, wherein before performing the illuminant estimation, the digital circuit performs black level estimation to obtain a black level according to pixel data generated for pixel elements corresponding to the third group, and performs black level correction of both the pixel data generated for the pixel elements corresponding to the second group of selectively transmissive filters and the pixel data generated for the pixel elements corresponding to the first group of selectively transmissive filters according to the black level.

7. The image sensor of claim 1, wherein the digital circuit performs color correction or lens shading correction on pixel data generated for pixel elements corresponding to the first group of selectively transmissive filters, to generate the pixel data representing the image of the scene.

8. The image sensor of claim 1, wherein at least one portion of the second group of selectively transmissive filters is disposed and arranged in at least one area enclosed by the first group of selectively transmissive filters.

9. The image sensor of claim 1, wherein for the image of the scene, at least one output signal of at least one pixel element corresponding to the first group of selectively transmissive filters is output after at least one output signal of at least one pixel element corresponding to the second group of selectively transmissive filters is output.

10. An illuminant estimation method for an image sensor, the image sensor comprising a multi-band color filter array (CFA), the illuminant estimation method comprising the steps of:

determining a plurality of spectral ratio vectors associated with a plurality of pre-defined light sources, respectively;

receiving a series of multi-band CFA pixel data from the image sensor;

computing a mean value for each spectral channel of a plurality of spectral channels and converting mean values respectively corresponding to the plurality of spectral channels into vector elements of a current spectral ratio vector;

comparing the current spectral ratio vector with the spectral ratio vectors of the pre-defined light sources and computing a norm of the current spectral ratio vector and each of the spectral ratio vectors of the pre-defined light sources, to determine a specific pre-defined light source whose spectral ratio vector is closest to the current spectral ratio vector within the plurality of pre-defined light sources; and outputting a detection result indicating the specific pre-defined light source whose spectral ratio vector is closest to the current spectral ratio vector within the plurality of pre-defined light sources.

11. The illuminant estimation method of claim 10, wherein right after computing the mean for each spectral channel of the plurality of spectral channels and converting the spectral channel mean values into the vector elements of the current spectral ratio vector, the current spectral ratio vector is multiplied by a spectral conversion vector so that one or more spectral bands of interest are further weighted.

12. An apparatus that operates according to the method of claim 10, wherein the apparatus comprises the image sensor.

13. The apparatus of claim 12, wherein the image sensor comprises:

a two dimensional array of pixel elements, arranged to receive light energy of incident light and to convert the received light energy into electrical signals;

a color filter array, superimposed on and in registration with the two dimensional array of pixel elements, the color filter array comprising:

a first group of selectively transmissive filters, arranged to selectively transmit spectral energy in M colors of the visible spectrum, wherein M is a positive integer that is larger than two; and a second group of selectively transmissive filters, arranged to selectively transmit spectral energy in N colors of the visible spectrum, wherein any selectively transmissive filter of the first and the second groups of selectively transmissive filters is arranged to transmit spectral energy in one specific color of the visible spectrum, and N is a positive integer that is larger than M; and a digital circuit, coupled to the two dimensional array of pixel elements, configured to generate a plurality of output signals for pixel elements within the two dimensional array of pixel elements, wherein at least one portion of the output signals carries pixel data representing an image of a scene;

wherein the color filter array comprises the multi-band color filter array (CFA).

* * * * *